(12) United States Patent
Britt et al.

(10) Patent No.: US 10,738,660 B2
(45) Date of Patent: Aug. 11, 2020

(54) GENERATING STEAM TURBINE PERFORMANCE MAPS

(71) Applicant: Woodward, Inc., Fort Collins, CO (US)

(72) Inventors: Tena K. Britt, Loveland, CO (US); Scott David Oceanak, Fort Collins, CO (US); Dave Rubenthaler, Fort Colliins, CO (US); Aaron Russo, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 34 days.

(21) Appl. No.: 16/290,613

(22) Filed: Mar. 1, 2019

(65) Prior Publication Data

US 2019/0195093 A1    Jun. 27, 2019

Related U.S. Application Data

(63) Continuation of application No. 15/424,643, filed on Feb. 3, 2017, now Pat. No. 10,260,377.

(51) Int. Cl.
*F01K 7/20* (2006.01)
*F01D 17/02* (2006.01)
(Continued)

(52) U.S. Cl.
CPC .............. *F01K 7/20* (2013.01); *F01D 17/02* (2013.01); *F01D 17/145* (2013.01); *F01K 7/04* (2013.01);
(Continued)

(58) Field of Classification Search
CPC ... F01K 7/165; F01K 7/22; F01K 7/04; F01K 7/16; F01K 7/20; F01K 7/24; F01K 7/345; F01D 17/24; F01D 17/145
See application file for complete search history.

(56) References Cited

U.S. PATENT DOCUMENTS 4,005,581 A    2/1977 Aanstad
4,258,424 A    3/1981 Giras et al.
(Continued)

FOREIGN PATENT DOCUMENTS

JP     S63117106    5/1988

OTHER PUBLICATIONS

International Search Report and Written Opinion in International Application No. PCT/US2018/016469, dated May 16, 2018, 12 pages.

*Primary Examiner* — Jonathan R Matthias
(74) *Attorney, Agent, or Firm* — Fish & Richardson P.C.

(57) ABSTRACT

In some aspects, a steam turbine system includes a high-pressure turbine section; a low-pressure turbine section; a high-pressure control valve operable to provide an adjustable flow of steam into the high-pressure turbine section; a low-pressure control valve operable to provide an adjustable flow of steam into the low-pressure turbine section; a controller associated with the high-pressure control valve and the low-pressure control valve. The controller is operable to: receive measurements of three or more different operating points of the steam turbine system, the measurements of each of the three or more different operating points including a position of the high-pressure control valve, a position of the low-pressure control valve, and two of process variables of the steam turbine system; calculate coefficients of a steam performance map of the steam turbine system based on the measurements; and generate the steam performance map based on the coefficients.

20 Claims, 6 Drawing Sheets

(51) Int. Cl.
*F01D 17/14* (2006.01)
*F01K 7/04* (2006.01)
*F01K 13/02* (2006.01)
*F02C 9/16* (2006.01)
*F02C 9/28* (2006.01)

(52) U.S. Cl.
CPC ............... F01K 13/02 (2013.01); F02C 9/16 (2013.01); F02C 9/28 (2013.01); *F05D 2260/80* (2013.01); *F05D 2270/05* (2013.01); *F05D 2270/20* (2013.01); *F05D 2270/3061* (2013.01)

(56) References Cited

U.S. PATENT DOCUMENTS

| | | |
|---|---|---|
| 4,577,281 A | 3/1986 | Bukowski et al. |
| 8,437,941 B2 | 5/2013 | Chandler |
| 10,260,377 B2 | 4/2019 | Britt et al. |
| 2012/0156004 A1 | 6/2012 | Sathyanarayana et al. |
| 2013/0204816 A1 | 8/2013 | Hannula et al. |
| 2013/0243574 A1 | 9/2013 | Jahami |
| 2018/0223695 A1 | 8/2018 | Britt et al. |

GENERATING STEAM TURBINE PERFORMANCE MAPS

CROSS-REFERENCE TO RELATED APPLICATIONS

This application is a continuation application of and claims priority to U.S. application Ser. No. 15/424,643, filed on Feb. 3, 2017, the contents of which are hereby incorporated by reference.

BACKGROUND

This specification relates to generating a performance map of a steam turbine system.

A steam turbine system can extract thermal energy from pressurized steam and use the energy to do mechanical work on a rotating output shaft, for example, to drive an electrical generator. The steam turbine can use multiple stages in the expansion of the steam such that steam can be admitted or extracted before the last stage, for example, to improve thermodynamic efficiency.

SUMMARY

In some aspects, a steam turbine system includes a high-pressure turbine section; a low-pressure turbine section; a high-pressure control valve operable to provide an adjustable flow of steam into the high-pressure turbine section; a low-pressure control valve operable to provide an adjustable flow of steam into the low-pressure turbine section; a controller associated with the high-pressure control valve and the low-pressure control valve, the controller operable to: receive measurements of three or more different operating points of the steam turbine system, the measurements of each of the three or more different operating points including a position of the high-pressure control valve, a position of the low-pressure control valve, and two of process variables of the steam turbine system; calculate coefficients of a steam performance map of the steam turbine system based on the measurements of each of the three or more different operating points, the steam performance map representing a first relationship between the position of the high-pressure control valve and the two of the process variables of the steam turbine system, and a second relationship between the position of the low-pressure control valve and the two of the process variables of the steam turbine system; and generate the steam performance map of the steam turbine system based on the coefficients.

In some implementations, the controller is further operable to: receive current values of the two of the process variables of the steam turbine system; determine a desired position of the high-pressure control valve and a desired position of the low-pressure control valve based on the coefficients of the steam performance map of the steam turbine system and the current values of the two of the process variables of the steam turbine system; output the desired position of the high-pressure control valve to a first actuator coupled with the high-pressure control valve; and output the desired position of the low-pressure control valve to a second actuator coupled with the low-pressure control valve.

In some implementations, the steam turbine system further includes a number of sensors for measuring the two of the process variables of the steam turbine system.

In some implementations, the process variables of the steam turbine system include two or more of the following: turbine speed, turbine load, extraction or admission pressure or flow, inlet steam pressure or flow, and exhaust steam pressure or flow of the steam turbine system.

In some implementations, the low-pressure turbine section is a first low-pressure turbine section; and the low-pressure control valve is a first low-pressure control valve, the steam turbine system including one or more low-pressure turbine sections in addition to the first low-pressure turbine section and one or more low-pressure control valves in addition to the first low-pressure control valve.

In some implementations, the controller is operable to calculate the coefficients of a steam performance map of the steam turbine system by curve fitting the measurements of the three or more different operating points.

In some implementations, the steam turbine system operates in an extraction mode or an admission mode.

In some aspects, a method for generating a steam performance map of a steam turbine system includes: receiving, by data processing apparatus, measurements of three or more different operating points of the steam turbine system, the measurements of each of the three or more different operating points including a position of the high-pressure control valve, a position of the low-pressure control valve, and two of process variables of the steam turbine system; calculating, by the data processing apparatus, coefficients of a steam performance map of the steam turbine system based on the measurements of each of the three or more different operating points, the steam performance map representing a first relationship between the position of the high-pressure control valve and the two of the process variables of the steam turbine system, and a second relationship between the position of the low-pressure control valve and the two of the process variables of the steam turbine system; and generating, by the data processing apparatus, the steam performance map of the steam turbine system based on the coefficients.

In some implementations, the method further includes controlling the steam turbine system based on the steam performance map of the steam turbine system.

In some implementations, the controlling the steam turbine system based on the steam performance map of the steam turbine system includes: receiving current values of the two process variables of the steam turbine system; determining a desired position of the high-pressure control valve and a desired position of the low-pressure control valve based on the coefficients of the steam performance map of the steam turbine system and the current values of the two process variables of the steam turbine system; outputting the desired position of the high-pressure control valve to an actuator coupled with the high-pressure control valve; and outputting the desired position of the low-pressure control valve to an actuator coupled with the low-pressure control valve.

In some implementations, the method further includes: operating the steam turbine system at the three or more different operating points; and for the each of the three or more different operating points, measuring the position of the high-pressure control valve, the position of the low-pressure control valve, and the two of the process variables of the steam turbine system.

In some implementations, the process variables of the steam turbine system include two or more of the following: turbine speed, turbine load, extraction or admission pressure or flow, inlet steam pressure or flow, and exhaust steam pressure or flow of the steam turbine system.

In some implementations, one of the two of the process variables of the steam turbine system includes a turbine load or a turbine speed, and another of the two of the process variables of the steam turbine system includes an extraction pressure or flow of the steam turbine system.

In some implementations, the calculating coefficients of a steam performance map of the steam turbine system includes calculating the coefficients of a steam performance map of the steam turbine system by curve fitting the measurements of each of the three or more different operating points.

In some aspects, a non-transitory computer-readable medium stores instructions that, when executed by data processing apparatus, perform operations for generating a steam performance map of a steam turbine system that includes a high-pressure control valve operable to provide an adjustable flow of steam fluid into a high-pressure turbine section and a low-pressure control valve operable to provide an adjustable flow of steam fluid into a low-pressure turbine section. The operations include: receiving, by data processing apparatus, measurements of three or more different operating points of the steam turbine system, the measurements of each of the three or more different operating points including a position of the high-pressure control valve, a position of the low-pressure control valve, and two of process variables of the steam turbine system; calculating, by the data processing apparatus, coefficients of a steam performance map of the steam turbine system based on the measurements of each of the three or more different operating points, the steam performance map representing a first relationship between the position of the high-pressure control valve and the two of the process variables of the steam turbine system, and a second relationship between the position of the low-pressure control valve and the two of the process variables of the steam turbine system; and generating, by the data processing apparatus, the steam performance map of the steam turbine system based on the coefficients.

In some implementations, the operations further include controlling the steam turbine system based on the steam performance map of the steam turbine system.

In some implementations, the controlling the steam turbine system based on the steam performance map of the steam turbine system includes: receiving current values of the two process variables of the steam turbine system; determining a desired position of the high-pressure control valve and a desired position of the low-pressure control valve based on the coefficients of the steam performance map of the steam turbine system and the current values of the two process variables of the steam turbine system; outputting the desired position of the high-pressure control valve to an actuator coupled with the high-pressure control valve; and outputting the desired position of the low-pressure control valve to an actuator coupled with the low-pressure control valve.

In some implementations, the operations further include: operating the steam turbine system at the three or more different operating points; and for the each of the three or more different operating points, measuring the position of the high-pressure control valve, the position of the low-pressure control valve, and the two of the process variables of the steam turbine system.

In some implementations, the process variables of the steam turbine system include two or more of the following: turbine speed, turbine load, extraction or admission pressure or flow, inlet steam pressure or flow, and exhaust steam pressure or flow of the steam turbine system.

In some implementations, the calculating coefficients of a steam performance map of the steam turbine system includes calculating the coefficients of a steam performance map of the steam turbine system by curve fitting the measurements of each of the three or more different operating points.

The details of one or more implementations are set forth in the accompanying drawings and the description below. Other features, objects, and advantages will be apparent from the description and drawings, and from the claims.

DETAILED DESCRIPTION

Figure 1:
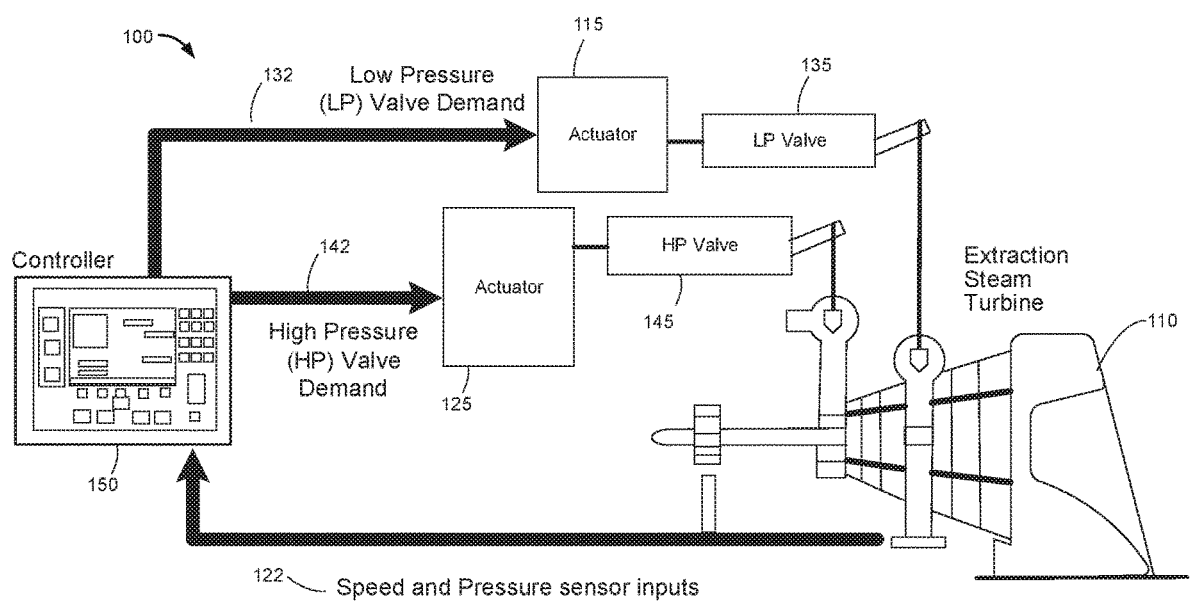
FIG. 1 is a schematic diagram of an example extraction steam turbine system.

A steam turbine can be configured to operate in an extraction mode (referred to as an extraction steam turbine), an admission mode (referred to as an admission steam turbine), or an alternating mode where the steam turbine alternates between an extraction mode and an admission mode. In an extraction steam turbine, steam can be extracted from a turbine before the steam flows through the last stage. In an admission steam turbine, steam can be admitted to a turbine before the steam flows through the last stage. In an extraction/admission steam turbine, steam can be admitted or extracted to the turbine before the steam flows through the last stage. In some implementations, steam turbines can include more than one extraction/admission line.

As an example, an extraction turbine extracts steam from an intermediate stage of a steam turbine, and supplies the steam to a process system such as a plant for use. For example, an extraction steam turbine may include a high-pressure (HP) section and a low-pressure (LP) section. Steam enters the extraction steam turbine through a high-pressure inlet control valve and expands through the high-pressure section of the turbine, losing both pressure and temperature, as the steam energy is converted to the mechanical power transmitted by the steam turbine shaft. Steam is extracted from the turbine at an intermediate stage of the steam turbine and can be used for various plant processes. The steam that is not extracted flows through a low-pressure control valve to the low-pressure section of the extraction steam turbine and continues to expand, converting the steam energy into shaft power. The shaft of the turbine can be common to both the high-pressure and low-pressure turbine sections.

Similarly, in some implementations, an admission steam turbine includes a high-pressure turbine section and a low-pressure turbine section. Steam enters the turbine through the high-pressure inlet control valve and expands through the high-pressure section of the turbine, losing both pressure and temperature, as the steam energy is converted to the mechanical power transmitted by the steam turbine shaft. Additional steam can be admitted into the admission turbine at an intermediate stage of the steam turbine and may be supplied from various plant processes. The admitted steam flows through the low-pressure control valve to the low-pressure section of the turbine, where the admitted steam is combined with the steam flow from the high-pressure section. The combined steam expands through the low-pressure section of the turbine where the steam energy is converted into shaft power. The shaft of the turbine can be common to both the high-pressure and low-pressure sections.

In some implementations, a steam turbine can be configured to alternate between extracting steam and admitting steam based on plant conditions. While the steam turbine extracts steam, the steam that is not extracted flows through the low-pressure control valve to the low-pressure section of the turbine where it continues to expand, converting the steam energy into shaft power. When the steam turbine admits steam, the admitted steam flows through the low-pressure control valve to the low-pressure section of the turbine, where it combines with the steam flow from the high-pressure section and expands through the low-pressure section of the turbine, converting the steam energy into shaft power. The shaft of the turbine can be common to both the high-pressure and low-pressure sections.

In the following, a steam turbine system configured to operate in an extraction only, admission only, or extraction or admission mode is collectively referred to as an extraction or admission steam turbine, unless otherwise specified.

Extraction or admission steam turbines are generally controlled with Multi-Input Multi-Output (MIMO) ratio-limiting electronic control systems. In some implementations, the extraction or admission steam turbine system includes two process variables (also referred to as controllable parameters): extraction or admission pressure/flow and turbine speed/load. The parameters can be controlled through the positions of the HP and LP control valves. The relationship of valve positions to extraction or admission flow and turbine power is typically provided by a turbine original equipment manufacturer (OEM), at rated conditions, in a steam performance map. In the case of extraction turbines with more than one LP valve, a performance map for each LP stage is typically provided. In some implementations, the performance map can represent the relationship between two or more of speed/load and extraction pressure, inlet and extraction pressure, inlet and exhaust pressure, etc. In some implementations, the performance map can also be multi-dimensional. For example, the performance map can include three variables such as speed, extraction pressure, and exhaust pressure if there are two extraction lines.

In some implementations, each controllable parameter has an associated proportional-integral-derivative (PID) controller. For example, the extraction steam turbine system can include a Speed/Load PID controller and extraction Flow/Pressure PID controller; the admission steam turbine system can include a Speed/Load PID controller and admission Flow/Pressure PID controller. In some implementations, a change in the HP valve position has an effect on both the turbine speed/load as well as the extraction pressure/flow. Similarly, a change in the LP valve position may result in a change to both turbine speed/load as well as the extraction pressure/flow. In some implementations, the output of each PID controller is used to determine the HP and LP opening degrees in order to regulate the steam flow through each section of the turbine.

The relationship between outputs of the PID controller and the resulting valve positions can be given by a steam performance map. For example, according to the steam performance map, a change in the speed control output of the Speed/Load PID controller can result in respective changes in the HP and LP valve positions such that the extraction pressure remains constant while the turbine speed/load changes. Similarly, according to the steam performance map, a change in the extraction control output can result in respective changes in the HP and LP valve positions such that turbine speed/load remains constant while the extraction pressure changes.

For an optimal performance, the extraction or admission turbine controller needs an accurate steam performance map which matches the extraction or admission turbine system it is controlling. An accurate steam performance map decouples the influence of one controller output on the other process input in the MIMO system. Over time, rated conditions for the turbine may change; turbines and valves may be overhauled; or generators or compressors may be replaced or overhauled, resulting in changes in the overall system dynamics and new relationship of the valve position versus the flow. Consequently, the original OEM specified map may no longer match the underlying extraction or admission turbine system. Degradation of control quality can occur when the electronic controller of the extraction or admission turbine system remains programmed with the original OEM specified map. Errors in the extraction or admission turbine system can lead to instability and require de-tuning of PID dynamics to reduce the interaction of the control loops.

This disclosure provides steam map discovery or generation techniques for generating a steam map based on actual responses and performances of the underlying extraction or admission steam turbine system. Rather than merely modifying an existing OEM steam map, a new steam performance map is created based on measurements of the system responses and the generated steam map can reflect actual plant conditions. As such, more accurate, effective control of the steam turbine system can be achieved. For example, the steam map generation techniques include changing the speed/load demand and monitoring both the speed/load and the pressure signals in response to the changing of the speed/load demand, and then changing the pressure demand and monitoring both the speed/load and pressure signals in response to the changing of the pressure demand again. From speed/load and pressure signal responses, both the speed/load of the responses and the amount of responses, a steam map can be generated. By changing each signal demand and measuring the response of both signals, the relationship between the turbine speed/load and extraction processes can be learned, based on the actual system responses, such that they can be de-coupled, rather than deducing the relationship from the predetermined OEM steam map provided by the manufacturer. By measuring the system responses and determining the relationship of the actual system, a more accurate steam performance map can be obtained based upon specific end-user site conditions.

In some implementations, the steam map generation techniques can be utilized by commissioning engineers for improving the performance of any extraction turbine already installed in the field. For example, the steam map generation techniques allow operators to verify or otherwise assess the OEM steam map provided for new installations or updated steam maps, as a result of site system changes or a turbine overhaul. In some implementations, the described steam map generation techniques can be executed periodically or from time to time (e.g., as frequently as necessary) to adjust for changes in the extraction or admission steam turbine system.

In some implementations, the steam map generation techniques can use process variables or parameters other than the turbine speed/load and extraction or admission pressure/flow. For example, for the three operating modes discussed above (i.e., extraction only, admission only, and alternating mode), there are at least four process variables or controllable parameters that can be used to generate a steam map: speed/load, extraction or admission pressure/flow, inlet steam pressure/flow, and exhaust steam pressure/flow. A single extraction steam turbine system can include two or more control valves, for example, an HP and at least one LP control valves. Therefore, any two or more (depending on the number of control valves) of the four process variables can be controlled at one time. For example, three process variables can be controlled at one time if there are three control valves in the extraction stream turbine system. In some implementations, six combinations of the process variables can be used as controllable parameters for generating the steam performance map. Each of the combination is referred to as Mode 0 to Mode 5 as below:

Mode 0=Speed/load and Extraction pressure/flow
Mode 1=Speed/load and Inlet pressure/flow
Mode 2=Extraction pressure/flow and Inlet pressure/flow
Mode 3=Speed/load and Exhaust pressure/flow
Mode 4=Exhaust pressure/flow and Extraction pressure/flow
Mode 5=Inlet pressure/flow and Exhaust pressure/flow While Mode 0 is discussed in the following as an example, the steam map generation techniques described in this disclosure can be used for any other control parameter combinations, such as the combinations in Mode 1-5. The steam performance map is indifferent to the actual process variables that are actively being controlled by the controller in the various modes.

FIG. 1 is a schematic diagram of an example extraction steam turbine system 100. The extraction steam turbine system 100 includes an extraction steam turbine 110 that is coupled with a controller 150. The extraction steam turbine 110 includes two control valves, the HP control valve 145 and the LP control valve 135, which control the steam flow. The extraction steam turbine 110 includes two actuators 125 and 115 which use mechanical linkages to control the inlet control valve (i.e., the HP control valve 145) and extraction control valve (i.e., the LP control valve 135), respectively. The extraction steam turbine system 100 can include one or more sensors (not shown) for measuring one or more process variables (e.g., speed/load, extraction or admission pressure/flow, inlet steam pressure/flow, and exhaust steam pressure/flow) of the extraction steam turbine system 100. One or more process variables can be used as control loop input to the controller, for example, for real-time control of the extraction steam turbine system 100. The controller 150 can receive example control loop inputs such as speed and pressure sensor inputs 122. The controller 150 outputs control output 142 to the actuator 125 for controlling the position of the HP control valve 145 and control output 132 to the actuator 115 for controlling the position of the LP control valve 135.

In the example steam turbine system 100 shown in FIG. 1, the two controllable parameters, Speed and Extraction, in Mode 0 refer to the speed of the steam turbine shaft, and the extraction header pressure or flow of the steam turbine, respectively. The two controllable parameters, Speed and Inlet, in Mode 1 refer to the speed of the steam turbine, and the inlet header pressure or flow of the steam turbine, respectively. The two controllable parameters, Extraction and Inlet, in Mode 2 refer to the extraction pressure or flow of the steam turbine, and the inlet header pressure or flow of the steam turbine, respectively. The two controllable parameters, Speed and Exhaust, in Mode 3 refer to the speed of the steam turbine shaft, and the exhaust pressure or flow of the steam turbine, respectively. The two controllable parameters, Exhaust and Extraction, in Mode 4 can be refer to the exhaust pressure or flow of the steam turbine, and the extraction header pressure or flow of the steam turbine, respectively. The two controllable parameters, Inlet and Exhaust, in Mode 5 refer to the inlet header pressure or flow of the steam turbine, and the exhaust pressure or flow of the steam turbine, respectively. The measurement of turbine speed, extraction pressure or flow, exhaust header pressure or flow, inlet header pressure or flow, can be obtained from transducers on the turbine. The signals from these transducers are wired to the control, shown in FIG. 1 as 122.

Figure 2:
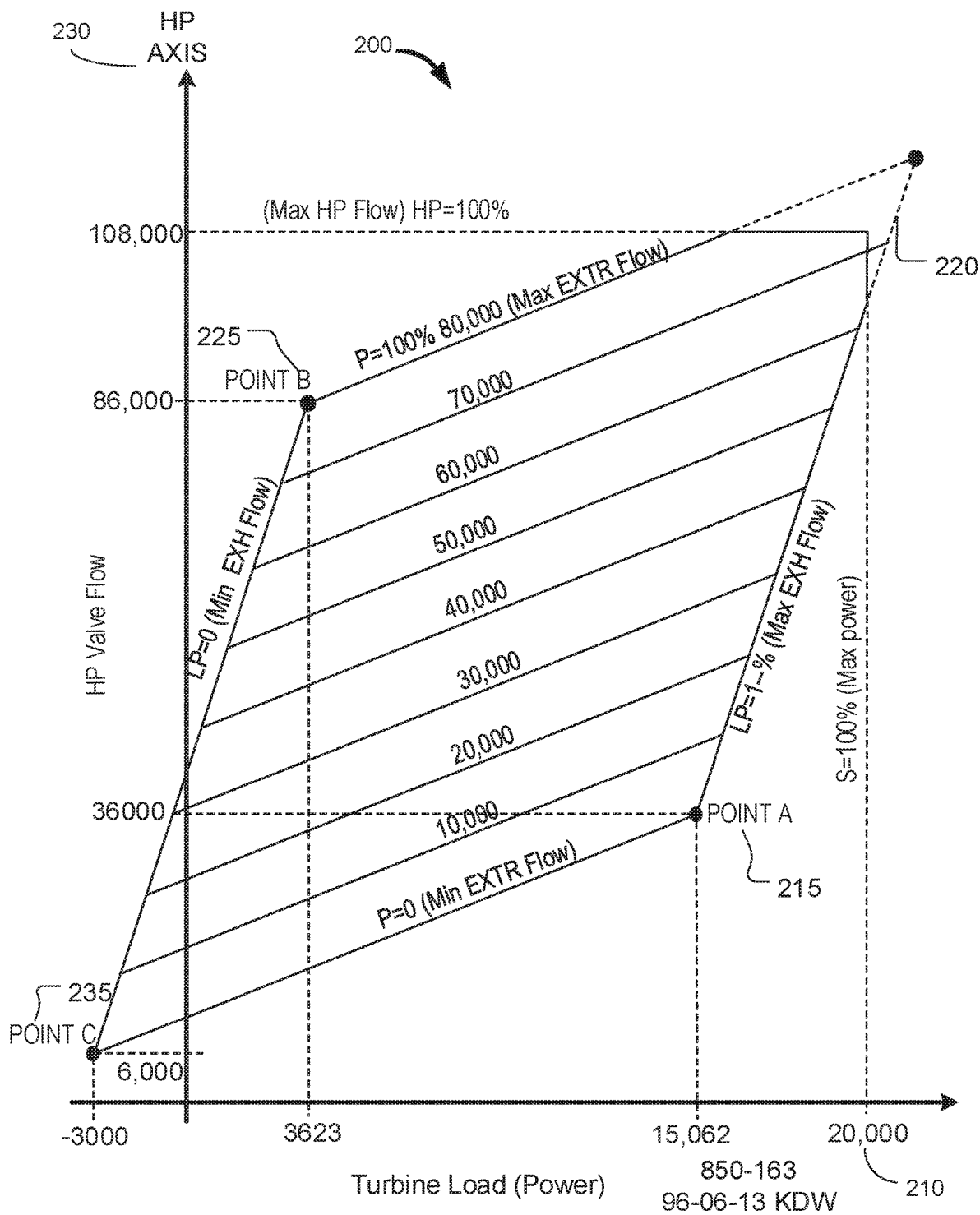
FIG. 2 is a plot illustrating an example original equipment manufacturer (OEM) steam performance map.

FIG. 2 is a plot illustrating an example original equipment manufacturer (OEM) steam performance curve 200 of a steam turbine system. Based on the steam performance curve 210, which is typically provided by the manufacturer of the turbine, a turbine control operational envelope 220 can be created, which is typically referred to as the steam performance map 220. The X-axis 210 represents the turbine load (S) and the Y-axis 230 represents the flow through the HP valve, which is typically directly proportional to the position of the HP valve of the steam turbine system. In some implementations, the actual steam map from the OEM is defined in flows, which can be converted to position and pressure relationships for the controller. As shown in FIG. 2, the steam), performance map 220 includes several vertices, Point A 215 (that represents the maximum turbine load/power and HP valve flow with minimum extraction flow), Point B 225 (that represents the minimum turbine load/power and HP valve flow at maximum extraction flow and Point C 235 (that represents the minimum turbine load/power and HP valve flow at minimum extraction flow).

Figure 3:
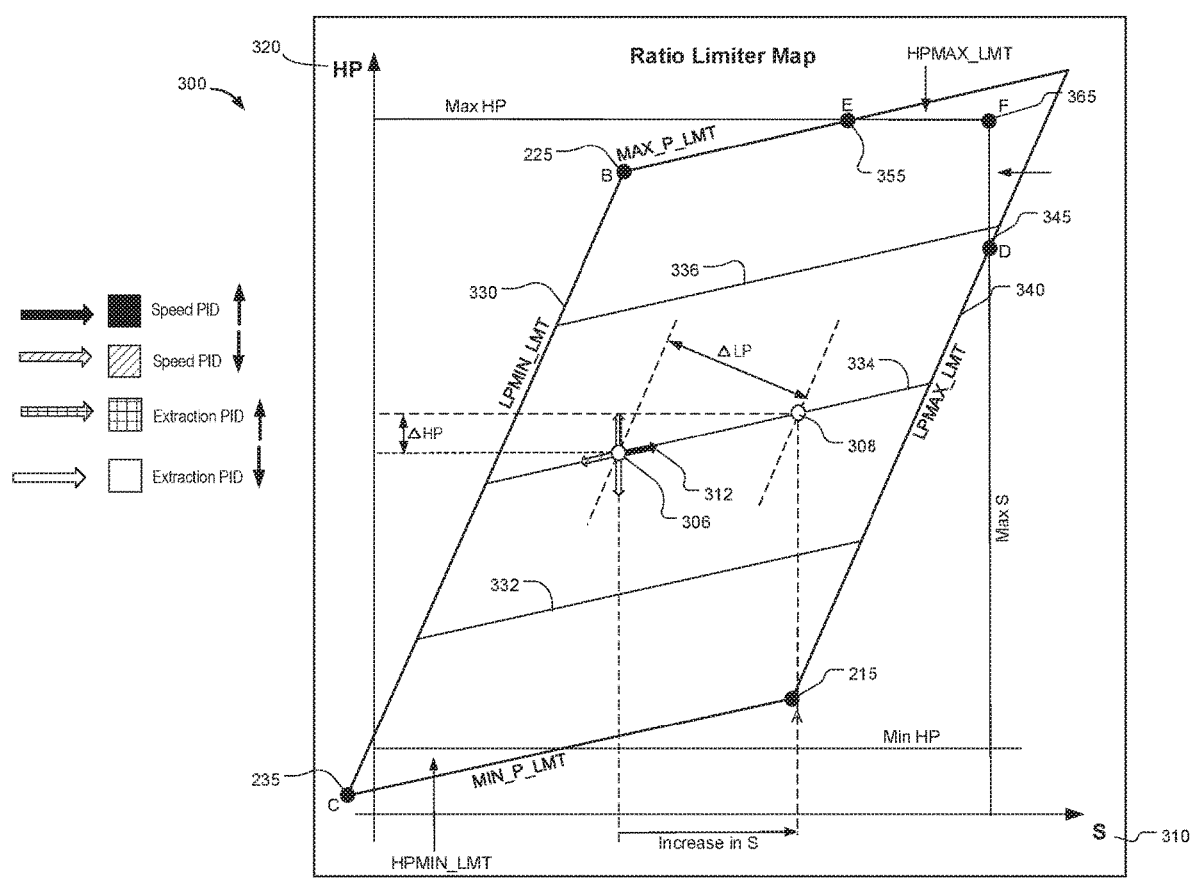
FIG. 3 is a plot illustrating an example steam map of an extraction steam turbine system generated according to example techniques described in this disclosure.

FIG. 3 is a plot illustrating an example steam map 300 generated according to the example steam map generation techniques. Rather than being derived from the OEM steam performance map 220 as shown in FIG. 2 (also shown in FIG. 3 for reference), the example steam map 300 is created based on actual measurements of an underlying steam turbine system (e.g., the example steam turbine system 100 in FIG. 1). Specifically, the example steam map 300 shows the relationship between the Speed/Load PID controller and Extraction PID controller of an extraction steam turbine system.

The X-axis 310 represents the turbine power/load (S) and the Y-axis 320 represents the position of the HP valve or the flow through that valve. Each of the circles (e.g., circle 306) is an operating point (determined by its HP and LP positions). Besides Point A 215, Point B 225, Point C 235, three other points are defined and denoted as solid dots: Point D 345 represents the HP position at maximum turbine load/power at maximum LP position; Point E 355 represents the turbine load/power at maximum HP position; and Point F 365 represents the LP position at maximum turbine load/power and maximum HP position. The lower limit of the LP valve position is given as the diagonal line 330 from Point C 235 to Point B 225 (Minimum LP Position). The upper limit of the LP valve position is given as the diagonal line 340 from Point A 215 to Point D 345 (Maximum LP Position). The "Constant P Line" (e.g., lines 332, 334, and 336) shows a constant extraction flow.

For a given operating point, a change in the demand of a PID controller (e.g., either from the Speed/Load PID controller or extraction Flow/Pressure PID controller) may result in respective movements of both the HP value and LP valve. The movements of the operating point are such that the other process remains constant. For example, an increase in extraction PID demand moves the operating point (e.g., the operating point 306) along a vertical line in the upwards direction to maintain constant load. This is accomplished by increasing the HP demand and decreasing the LP demand. The amount the HP and LP move as a result of a change in PID demand is referred to as "Ratioing."

For example, as shown in FIG. 3, the arrows from operating point 306 indicate the directions the operating point 306 will move for a corresponding change in a PID demand. For example, for an increase in demand from the Speed/Load PID, the operating point 306 moves in the direction of the arrow 312. In this example, the Speed/Load PID increases the S demand, while the extraction PID demand remains constant, moving the operating point from 306 to 308. The ratio limiter increases the HP demand by ΔHP and increases the LP demand by ΔLP. The operating point 306 achieves the increase in turbine load while the extraction process remains constant.

Figure 4:
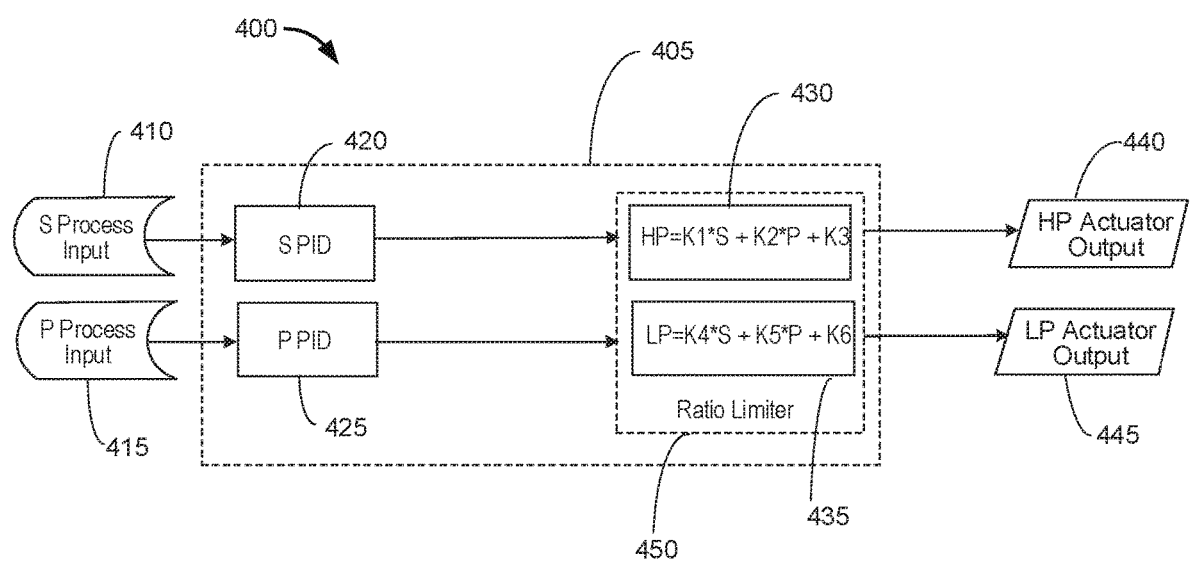
FIG. 4 is a schematic diagram illustrating an example steam turbine control circuit that includes functions blocks of a controller of a steam turbine system.

FIG. 4 is a schematic diagram illustrating an example steam turbine control circuit 400 that includes functions blocks of a controller of a steam turbine system (e.g., the controller 150 of the steam turbine system 100). In a single extraction steam turbine, two process variables can be controlled. As previously discussed, these process variables can be any of the four process variables: turbine speed/load, extraction/admission pressure/flow, inlet pressure/flow, and exhaust pressure/flow. In FIG. 4, these two process variables denoted as "S" and "P." Accordingly, the extraction steam turbine control circuit 400 includes an S process and a P process. The extraction steam turbine control circuit 400 includes a controller 405 that receives an S process input 410 (Usually speed or load of the turbine). The S process input 410 is input into a PID controller (denoted as S PID 420 in FIG. 4). The controller 405 can also receive a P process input 415 (usually extraction pressure/flow but can be, for example, inlet pressure/flow, or the exhaust pressure/flow). The P process input 415 is input into a different PID controller (denoted as P PID 425 in FIG. 4). The Speed/Load PID controller 420 receives the S process input 410 and generates an S demand output (e.g., a Speed/Load PID Demand) that is fed into a ratio limiter 450. Similarly, the Extraction PID controller 425 receives the P process input 415 and generates a P demand output (e.g., an Extraction PID demand) that is fed into the ratio limiter 450.

A ratio limiter can be used to reduce or limit interactions in a MIMO control system. If one of the control outputs affects both of the control inputs, the system is said to have interaction. Interaction can be reduced or even eliminated by use of a steam map or a ratio-limiter. Ratio refers to applying scaling terms to the demands for each of the control loops, such that each control loop controls both valves with minimal effect on the other control loop. A limiter refers to the case in which a valve or a control reaches its controlling limit.

The ratio limiter 450 in FIG. 4 can be used to reduce interactions in the MIMO controller 405 that receives the S process output and P process output, and generates an HP actuator output 440 and a LP actuator output 445. The ratio limiter 450 defines a relationship 430 among an HP valve position (represented by the HP actuator output 440) and the S PID demand and the P PID demand, as well as the relationship 435 among a LP valve position (represented by the LP actuator output 445) and the S PID demand and the P PID demand.

The relationships 430 and 435 are given by Equations (1) and (2), respectively:

$$HP = K1*S + K2*P + K3 \quad (1)$$

$$LP = K4*S + K5*P + K6 \quad (2)$$

In some implementations, the K values (i.e., K1, K2, K3, K4, K5, and K6) are derived from the OEM steam map (e.g., the OEM steam map 220 in FIG. 2). Each K term can be determined based on given or known operational points (e.g., the Point A 215, Point B 225, Point C 235 in FIG. 2) in the OEM steam map, which are defined by the X axis (S) and Y axis (HP) values in the steam map. For example, the coordinates of Point A 215, Point B 225, Point C 235 can be given as:

$$A = (SA, HA) \quad (3)$$

$$B = (SB, HB) \quad (4)$$

$$C = (SC, HC) \quad (5)$$

K1 can be derived as:

$$K1 = \frac{HA - HC}{SA - SC} \quad (6)$$

In this case, K1 represents the slope of the line from Point C 235 to Point A 225, which gives the change in HP over the change in S, for a constant P value. Similar derivations can be used to calculate K2-K6 in terms of points A, B, and C.

In some implementations, the OEM steam map may not reflect the actual conditions of the underlying steam turbine system. In some implementations, the K values (i.e., K1, K2, K3, K4, K5, and K6) are derived based on actual measurements of different operating points of the underlying steam turbine system. For example, an electronic controller can make system measurements by moving the steam turbine system to three or more different operating points and recording measurements (e.g., the HP valve position, the LP valve position, the load, and the extraction pressure) of each of the three or more different operating points.

Figure 6:
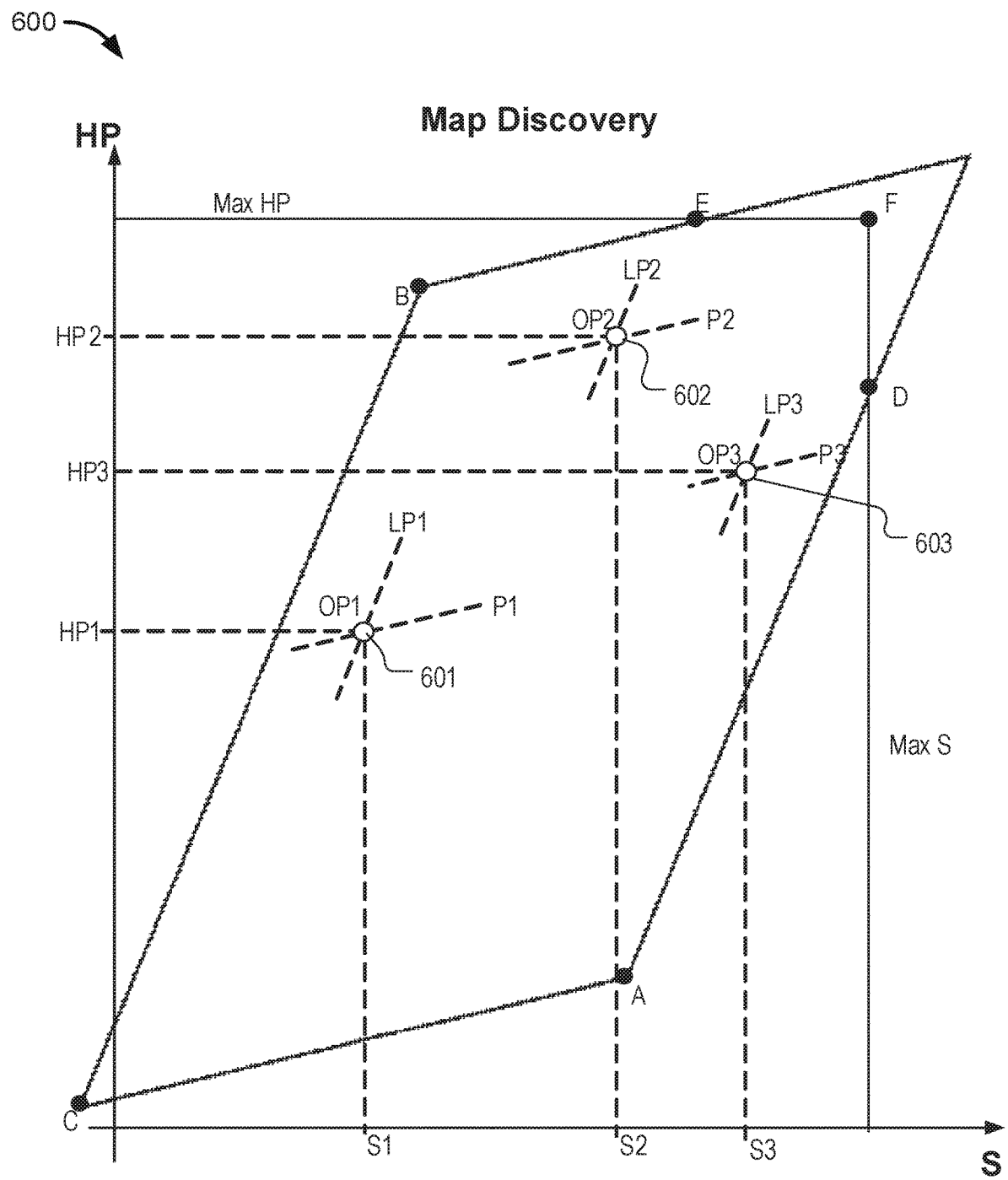
FIG. 6 is a plot illustrating another example steam map of an extraction steam turbine system generated according to example techniques described in this disclosure.

FIG. 6 is a plot illustrating another example steam map 600 of an extraction steam turbine system generated according to example techniques described in this disclosure. As an example, let Hp1, Lp1, S1, and P1 denote the HP valve position, the LP valve position, the load, and the extraction pressure of a first operating point (601) of the steam turbine system. Similarly, let Hp2, Lp2, S2, and P2 be the HP valve position, the LP valve position, the load, and the extraction pressure of a second operating point (602), respectively; and let Hp3, Lp3, S3, and P3 be the HP valve position, the LP valve position, the load, and the extraction pressure of a third operating point (603), respectively. The values of K1-K6 can be given by the below equations:

$$K3 = [Hp3*P2 - k1*S3*P2 - Hp2*P3 + k1*S2*P3]/(P2 - P3) \quad (7)$$

$$K2 = Hp2/P2 - k1*S2/P2 - (Hp3 - k1*S3 - Hp2*P3/P2 + k1*S2*P3/P2)/(P2 - P3) \quad (8)$$

$$K1 = (Hp1*(P2 - P3) + Hp2*(P3 - P1) + Hp3*(P1 - P2))/(S1*(P2 - P3) + S2*(-P1 + P3) + S3*(P1 - P2)) \quad (9)$$

$$K6 = [Lp3*P2 - k4*S3*P2 - Lp2*P3 + k4*S2*P3]/(P2 - P3) \quad (10)$$

$$K5 = Lp2/P2 - k4*S2/P2 - (Lp3 - k4*S3 - Lp2*P3/P2 + k4*S2*P3/P2)/(P2 - P3) \quad (11)$$

$$K4=(Lp1*(P2-P3)+Lp2*(P3-P1)+Lp3*(P1-P2))/$$
$$(S1*(P2-P3)+S2*(-P1+P3)+S3*(P1-P2)) \quad (12)$$

Once measurements have determined values for K1-K6, the Ratio-Limiter equations (e.g., the Equations (1) and (2)) are defined for the controller. In some implementations, in addition, points A, B, and C can be reverse calculated in order to provide the steam map back to the user for verification.

Figure 5:
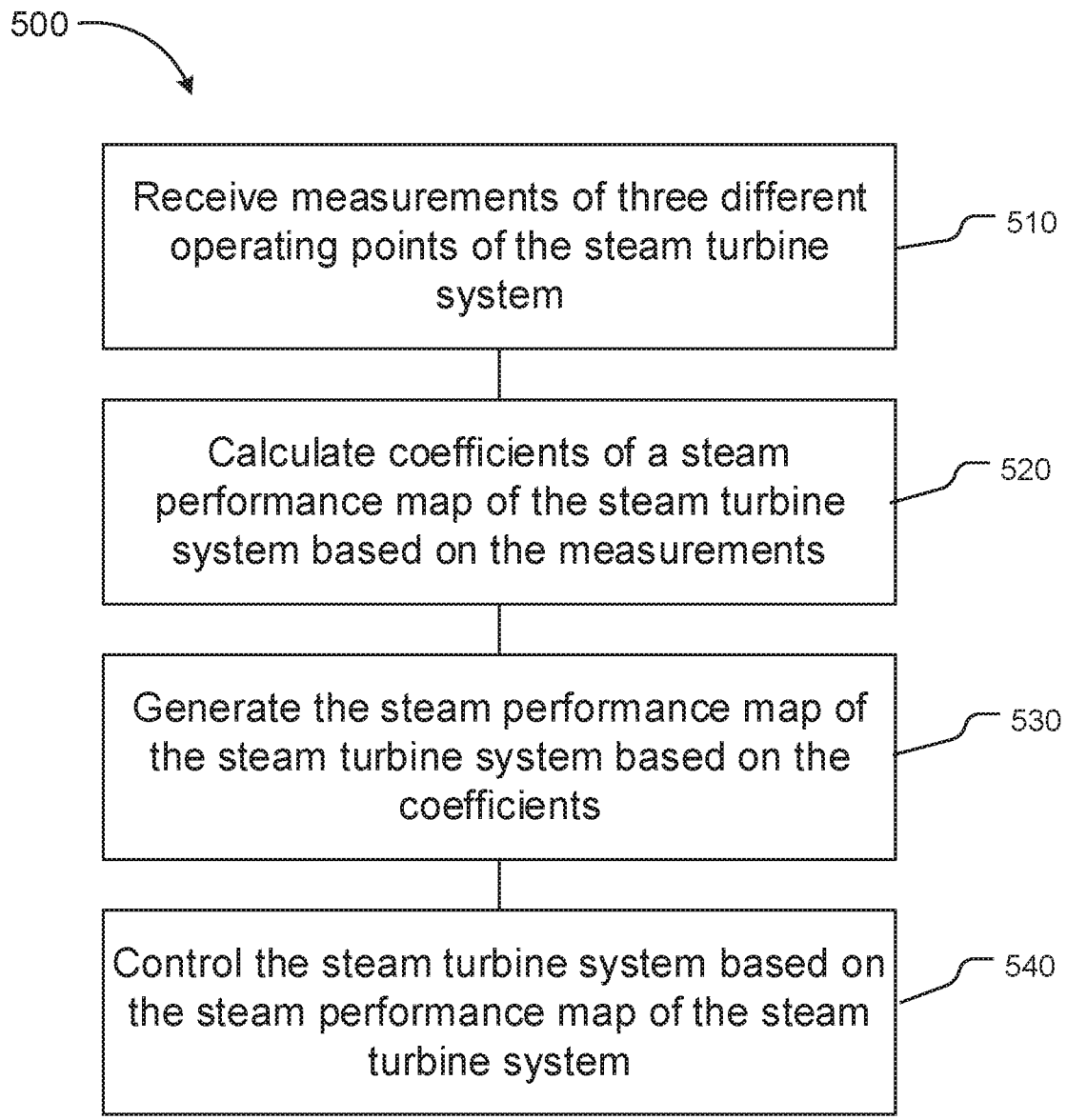
FIG. 5 is a flow diagram illustrating an example process for generating a steam map of a steam turbine system.

FIG. 5 is a flow diagram illustrating example process 500 for generating a steam performance map of a steam turbine system. The steam turbine system can be an extraction and/or admission steam turbine system (e.g., the steam turbine system 100 in FIG. 1). The steam turbine system includes, for example, a high-pressure turbine section, a low-pressure turbine section, a high-pressure control valve (e.g., the HP control valve 145) operable to provide an adjustable flow of steam into the high-pressure turbine section, a low-pressure control valve (e.g., the LP control valve 135) operable to provide an adjustable flow of steam into the low-pressure turbine section, and a controller (e.g., the controller 150) for controlling positions of the high-pressure control valve and the low-pressure control valve. In some implementations, the low-pressure turbine section is a first low-pressure turbine section; and the low-pressure control valve is a first low-pressure control valve. The steam turbine system can include one or more low-pressure turbine sections in addition to the first low-pressure turbine section and one or more low-pressure control valves in addition to the first low-pressure control valve. The controller can include one or more PID controllers (e.g., the S PID controller 420 and the P PID controller 425) for one or more process variables (e.g., speed/load, extraction or admission pressure/flow, inlet steam pressure/flow, and exhaust steam pressure/flow), a ratio limiter 450, and other data processing apparatus. The example process 500 can be performed by the controller or another data processing apparatus (e.g., an on-site or remote computer system). For example, the example process 500 can be performed by data processing apparatus that receives turbine data stored in a cloud/remote/edge server, for example, in the context of Internet of Thing (IoT) technology. In some implementations, generating a steam performance map of a steam turbine system includes determining the ratio limiter coefficients (e.g., constants K1-K6) of the ratio limiter of the controller of the steam turbine system. The generated steam performance map can be received, stored or otherwise made available to the controller such that the controller controls the steam turbine system according to the generated steam performance map.

At 510, measurements of three or more different operating points of the steam turbine system are received. The measurements of each of the three or more different operating points can include a position of the high-pressure control valve, a position of the low-pressure control valve, and two of process variables of the steam turbine system. In some implementations, the measurements of the three or more different operating points are obtained by operating the steam turbine system at the three or more different operating points under different operating conditions; and for each of the three or more different operating points, measuring the position of the high-pressure control valve, the position of the low-pressure control valve, and the two of the process variables of the steam turbine system. In some implementations, the measurements of the different operating points can include additional or different parameters. For example, the measurements of the different operating points can include a different combination of a position of the high-pressure control valve, a position of the low-pressure control valve, and process variables of the steam turbine system. The measurements can be received, for example, by receiving data directly or indirectly from sensors or other measuring or monitoring devices of the steam turbine system in real time or substantially real time, by retrieving historic data or records of the sensors or other measuring or monitoring devices from a data store on the site or in a cloud/remote/edge server, or in another appropriate manner.

In some implementations, the process variables of the steam turbine system include two or more of the following: turbine speed, turbine load, extraction or admission pressure or flow, inlet steam pressure or flow, and exhaust steam pressure or flow of the steam turbine system. In some implementations, one of the two of the process variables of the steam turbine system includes a turbine load or a turbine speed, and another of the two of the process variables of the steam turbine system includes an extraction pressure or flow of the steam turbine system.

In some implementations, the three or more different operating points can include a known point (e.g., (0,0)) and two or more operating points measured under different operating conditions that reflect actual responses or performances of the steam turbine system. A total of three or more operating points are used for generating the steam performance map.

At 520, coefficients of a steam performance map of the steam turbine system are calculated based on the measurements of each of the three or more different operating points. The steam performance map represents a first relationship between the position of the high-pressure control valve and the two of the process variables of the steam turbine system, and a second relationship between the position of the low-pressure control valve and the two process variables of the steam turbine system. The first relationship and the second relationship can be linear or nonlinear. For example, Equation (1) shows an example of the first relationship between the position of the high-pressure control valve and the two of the process variables of the steam turbine system; and Equation (2) shows an example of the second relationship between the position of the low-pressure control valve and the two of the process variables of the steam turbine system. The coefficients of a steam performance map can include the ratio limiter coefficients (e.g., constants K1-K6 in Equations (1) and (2)) of a ratio limiter of the controller.

In some implementations, the coefficients of the steam performance map of the steam turbine system are calculated by curve fitting (including linear regression) or other statistic processing of the measurements of each of the three or more different operating points, according to the first relationship between the position of the high-pressure control valve and the two of the process variables of the steam turbine system and the second relationship between the position of the low-pressure control valve and the two of the process variables of the steam turbine system. Equations (7)-(12) show examples of calculating the coefficients of the steam performance map of the steam turbine system.

At 530, the steam performance map of the steam turbine system is generated based on the coefficients. The steam performance map is generated, for example, by plotting, reconstructing, or otherwise representing the first relationship between the position of the high-pressure control valve and the two of the process variables of the steam turbine system and the second relationship between the position of the low-pressure control valve and the two of the process variables of the steam turbine system by plugging in the determined coefficients.

At 540, the steam turbine system is controlled based on the steam performance map of the steam turbine system. In some implementations, controlling the steam turbine system based on the steam performance map of the steam turbine system includes, for example, receiving current values of the two process variables of the steam turbine system; determining a desired position of the high-pressure control valve and a desired position of the low-pressure control valve based on the coefficients of the steam performance map of the steam turbine system and the current values of the two process variables of the steam turbine system; outputting the desired position of the high-pressure control valve to an actuator coupled with the high-pressure control valve; and outputting the desired position of the low-pressure control valve to an actuator coupled with the low-pressure control valve.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory, or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network including a satellite link, and peer-to-peer networks (e.g., ad hoc peer-to-peer networks). The relationship of client and server arises by virtue of computer programs running on the respective computers and having a client-server relationship to each other.

A number of examples have been shown and described; various modifications can be made. While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented separately or in any suitable sub-combination. Accordingly, other implementations are within the scope of the following claims.

The invention claimed is:

1. A non-transitory computer-readable medium storing instructions that, when executed by data processing apparatus, perform operations for generating a steam performance map of a steam turbine system that comprises a high-pressure control valve operable to provide an adjustable flow of steam fluid into a high-pressure turbine section and a low-pressure control valve operable to provide an adjustable flow of steam fluid into a low-pressure turbine section, the operations comprising:

during operation of the steam turbine system:
changing a pressure or flow demand of the steam turbine system;
in response to the change of the pressure or flow demand of the steam turbine system, measuring a response to the change of the pressure or flow demand of the steam turbine system;
changing a speed or load demand of the steam turbine system;
in response to the change of the speed or load demand of the steam turbine system, measuring a response to the change of the speed or load demand of the steam turbine system;
wherein the response to the change of the pressure or flow demand of the steam turbine system and the response to the change of the speed or load demand of the steam turbine system comprises measurements of three or more different operating points of the steam turbine system, the measurements of each of the three or more different operating points including a position of the high-pressure control valve, a position of the low-pressure control valve, and two of process variables of the steam turbine system;
calculating coefficients of a steam performance map of the steam turbine system based on the measurements of each of the three or more different operating points, the steam performance map representing a first relationship between the position of the high-pressure control valve and the two of the process variables of the steam turbine system, and a second relationship between the position of the low-pressure control valve and the two of the process variables of the steam turbine system; and
generating the steam performance map of the steam turbine system based on the coefficients.

2. The non-transitory computer-readable medium of claim 1, wherein the operations further comprise:
receiving current values of the two of the process variables of the steam turbine system; determine a desired position of the high-pressure control valve and a desired position of the low-pressure control valve based on the coefficients of the steam performance map of the steam turbine system and the current values of the two of the process variables of the steam turbine system;
outputting the desired position of the high-pressure control valve to a first actuator coupled with the high-pressure control valve; and
outputting the desired position of the low-pressure control valve to a second actuator coupled with the low-pressure control valve.

3. The non-transitory computer-readable medium of claim 1, wherein the process variables of the steam turbine system comprise two or more of the following: turbine speed, turbine load, extraction or admission pressure or flow, inlet steam pressure or flow, and exhaust steam pressure or flow of the steam turbine system.

4. The non-transitory computer-readable medium of claim 1, wherein the calculating coefficients of a steam performance map of the steam turbine system comprises calculating the coefficients of a steam performance map of the steam turbine system by curve fitting the measurements of each of the three or more different operating points.

5. A method for generating a steam performance map of a steam turbine system, the steam turbine system comprising a high-pressure control valve, operable to provide an adjustable flow of steam fluid into a high-pressure turbine section, and a low-pressure control valve operable to provide an adjustable flow of steam fluid into a low-pressure turbine section, the method comprising:
receiving, by data processing apparatus, measurements of three or more different operating points of steam turbine system, the measurements of each of the three or more different operating points including a position of the high-pressure control valve, a position of the low-pressure control valve, and two of process variables of the steam turbine system;
calculating, by the data processing apparatus, coefficients of a steam performance map of the steam turbine system based on the measurements of each of the three or more different operating points, the steam performance map representing a first relationship between the position of the high-pressure control valve and the two of the process variables of the steam turbine system, and a second relationship between the position of the low-pressure control valve and the two of the process variables of the steam turbine system, wherein the calculating the coefficients comprises calculating slopes of constant process flows on the steam performance map based on the measurements of each of the three or more different operating points; and
generating, by the data processing apparatus, the steam performance map of the steam turbine system based on the coefficients.

6. The method of claim 5, further comprising controlling the steam turbine system based on the steam performance map of the steam turbine system.

7. The method of claim 6, wherein the controlling the steam turbine system based on the steam performance map of the steam turbine system comprises:
receiving current values of the two process variables of the steam turbine system;
determining a desired position of the high-pressure control valve and a desired position of the low-pressure control valve based on the coefficients of the steam performance map of the steam turbine system and the current values of the two process variables of the steam turbine system;
outputting the desired position of the high-pressure control valve to an actuator coupled with the high-pressure control valve; and
outputting the desired position of the low-pressure control valve to an actuator coupled with the low-pressure control valve.

8. The method of claim 5, further comprising:
operating the steam turbine system at the three or more different operating points; and for the each of the three or more different operating points, measuring the position of the high-pressure control valve, the position of the low-pressure control valve, and the two of the process variables of the steam turbine system.

9. The method of claim 5, wherein the process variables of the steam turbine system comprise two or more of the following: turbine speed, turbine load, extraction or admission pressure or flow, inlet steam pressure or flow, and exhaust steam pressure or flow of the steam turbine system.

10. The method of claim 5, wherein the calculating coefficients of a steam performance map of the steam turbine system comprises calculating the coefficients of a steam performance map of the steam turbine system by curve fitting the measurements of each of the three or more different operating points.

11. The method of claim 5, wherein the steam turbine system operates in an extraction mode or an admission mode.

12. A steam turbine system comprising:
a high-pressure turbine section;
a low-pressure turbine section;
a high-pressure control valve operable to provide an adjustable flow of steam into the high-pressure turbine section;
a low-pressure control valve operable to provide an adjustable flow of steam into the low-pressure turbine section; and
a controller associated with the high-pressure control valve and the low-pressure control valve, the controller operable to:
receive measurements of three or more different operating points of steam turbine system, the measurements of each of the three or more different operating points including a position of the high-pressure control valve, a position of the low-pressure control valve, and two of process variables of the steam turbine system;
calculate coefficients of a steam performance map of the steam turbine system based on the measurements of each of the three or more different operating points, the steam performance map representing a first relationship between the position of the high-pressure control valve and the two of the process variables of the steam turbine system, and a second relationship between the position of the low-pressure control valve and the two of the process variables of the steam turbine system, wherein the calculating coefficients comprises calculating slopes of constant process flows on the steam performance map based on the measurements of each of the three or more different operating points; and
generate the steam performance map of the steam turbine system based on the coefficients.

13. The steam turbine system of claim 12, wherein the controller is further operable to control the steam turbine system based on the steam performance map of the steam turbine system.

14. The steam turbine system of claim 13, wherein the controller is operable to control the steam turbine system by:
receiving current values of the two process variables of the steam turbine system;
determining a desired position of the high-pressure control valve and a desired position of the low-pressure control valve based on the coefficients of the steam performance map of the steam turbine system and the current values of the two process variables of the steam turbine system;
outputting the desired position of the high-pressure control valve to an actuator coupled with the high-pressure control valve; and
outputting the desired position of the low-pressure control valve to an actuator coupled with the low-pressure control valve.

15. The steam turbine system of claim 12, wherein the controller is further operable to:
operate the steam turbine system at the three or more different operating points; and
for the each of the three or more different operating points, measure the position of the high-pressure control valve, the position of the low-pressure control valve, and the two of the process variables of the steam turbine system.

16. The steam turbine system of claim 12, further comprising a plurality of sensors for measuring the two of the process variables of the steam turbine system.

17. The steam turbine system of claim 12, wherein the process variables of the steam turbine system include two or more of the following: turbine speed, turbine load, extraction or admission pressure or flow, inlet steam pressure or flow, and exhaust steam pressure or flow of the steam turbine system.

18. The steam turbine system of claim 12, wherein the low-pressure turbine section is a first low-pressure turbine section; and the low-pressure control valve is a first low-pressure control valve, the steam turbine system comprising one or more low-pressure turbine sections in addition to the first low-pressure turbine section and one or more low-pressure control valves in addition to the first low-pressure control valve.

19. The steam turbine system of claim 12, wherein the controller is operable to calculate the coefficients of a steam performance map of the steam turbine system by curve fitting the measurements of each of the three or more different operating points.

20. The steam turbine system of claim 12, wherein the steam turbine system operates in an extraction mode or an admission mode.

* * * * *